Patented Sept. 11, 1923.

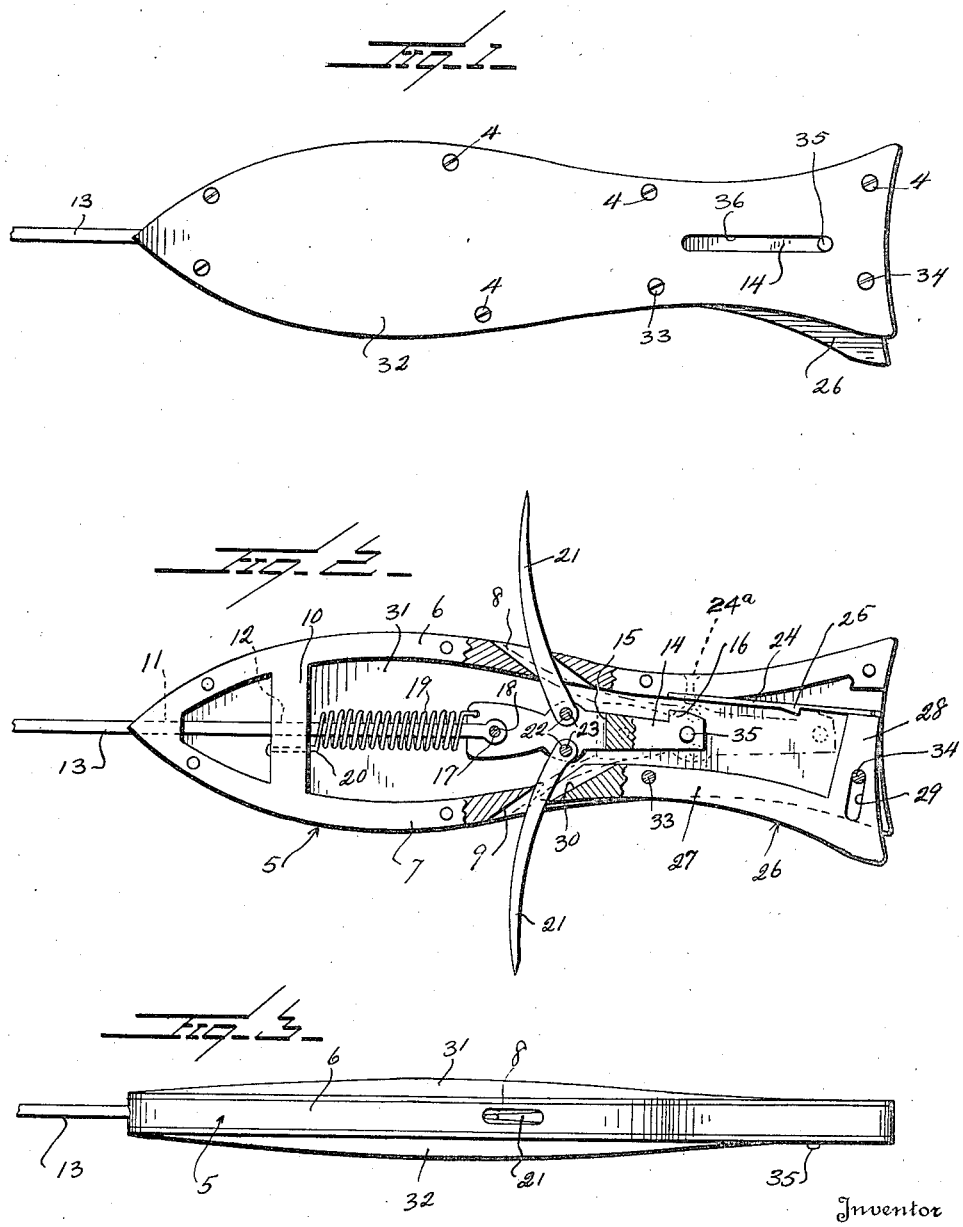

1,467,750

UNITED STATES PATENT OFFICE.

CARL W. BORG, OF ABERDEEN, WASHINGTON.

ARTIFICIAL BAIT.

Application filed December 23, 1922. Serial No. 608,682.

*To all whom it may concern:*

Be it known that I, CARL W. BORG, a citizen of the United States, residing at Aberdeen, in the county of Grays Harbor and State of Washington, have invented certain new and useful Improvements in Artificial Bait, of which the following is a specification, reference being had to the accompanying drawings.

This invention relates to artificial bait, and has for its object to provide a device of this character having normally retracted hooks automatically projectable outward from the bait when the fish takes the bait.

It is a further object of the invention to provide a device of this character wherein the hooks may be readily retracted into the body member to their set position.

With these and other objects in view, the invention consists in the improved construction and arrangement of parts to be hereinafter more particularly described, fully claimed and illustrated in the accompanying drawings, in which:—

Figure 1 is a side elevation of a fish hook and artificial bait constructed in accordance with an embodiment of the invention;

Figure 2 is a view with one side of the body member broken away and a portion of the frame of the body member being shown in section, the hooks being disposed in their extended positions; and Figure 3 is an edge elevation showing the openings for the hooks.

Referring to the drawings, 5 designates a frame which is shaped to simulate the body of a fish, said frame including arms 6 and 7. The arm 7 is considerably shorter than the arm 6, or in other words, terminates centrally of the frame. The arm 6 is provided with an obliquely extending opening 8, while the arm 7 has an obliquely extending recess 9 in its end. A brace 10 extends between the arms 6 and 7 at the forward end of the frame, the forward portion or apex of the frame having an opening 11 which aligns with an opening 12 provided in the brace 10. This opening is intended to receive a rod 13. This rod may be used for setting the device.

Disposed in the frame, adjacent the end of the arm 7, is a holding member 14, said member being bifurcated from its central portion toward one end thereof to provide a compartment 15, that end of the holding member remote from the bifurcation being provided with a lip 16. The inner end portion of the rod 13 is disposed within the compartment 15, said end portion of the rod having an eye 17 adapted to receive the pivot pin 18.

Connected to the holding member adjacent the pivot pin 18 is a coiled expansion spring 19, said spring surrounding the rod 13 and having its opposite end 20 connected to the brace 10. Disposed in the compartment, between the end wall of the compartment and the end of the rod 13, are hooks 21, each hook having an opening 22 receiving a pivot pin 23 which extends transversely of the compartment 15. These hooks are curved longitudinally, one hook being arranged to extend through the opening 8, while the other hook is guided by the recess 9 of the arm 7. It will be noted that the rear end of the frame 5 is open. Secured by a screw 24ª to the inner face of the arm 6 adjacent the lower end thereof is a trigger spring 24 having a lip 25 disposed adjacent one end thereof. This lip is intended to be engaged by the lip 16 of the holding member. In order to complete the frame, to simulate the body of a fish, a trigger member 26 is provided. said member having an arm 27 which corresponds to the forward portion of the arm 7. The arm 27 is provided with an extension 28 which forms the end or tail of the body member. This arm is provided with a longitudinal slot 29. The extremity of the arm 27 is beveled and provided with a recess 30. To complete the fish, a plate 31 is secured to one side portion of the frame 5, while a plate 32 is secured to the opposite side of the frame 5. These plates are secured to the frame by screws 4 and cooperate to provide a recess for the reception of the trigger member 26, said member being pivoted between the plates on a pin 33, a stop pin 34 projecting between the plates and through the slots 29. The end of the arm 28 of the trigger member 26 is intended to engage the outer end of the trigger spring 24, for the purpose of urging said spring toward the arm 6 when the bait is taken by the fish. Projecting from one side of the holding member 14 adjacent the lip 16 is a finger piece 35, said finger piece being adapted to extend through a slot 36 provided in the plate 32 and serves as means for setting the hooks.

In the operation of the device, the hooks may be set by either pressing upon the rod 13 so as to move the holding member longitudinally of the frame and toward the arm 28, or by moving the holding member through the medium of the finger piece 35 so as to permit the lip 16 to engage the lip 25. This retracts the hooks 21 within the frame. When in this position the trigger member 26 projects slightly from between the plates. Normally the blades or hooks 21 are retracted within the frame or body of the bait and the trigger member 26 is projected. This trigger member is forced inward when the fish attempts to swallow the bait. This causes the arm 28 to move the trigger spring 24 away from the holding member 14, thus releasing the holding member and permitting the holding member to be moved toward the forward end of the frame through the medium of the spring 19, thus projecting the hooks. It may be readily removed from the mouth of the fish by pressure on the rod 13 so as to retract the hooks 21.

From the foregoing it will be readily seen that this invention provides a novel form of artificial bait wherein the device is actuated by the fish independent of any action on the part of the fisherman, and wherein the hook members are supported by a holding member which in turn is substantially supported by the hooks in engagement with the arms of the frame, thus eliminating the necessity of the side portions of the holding member engaging the plates of the device. All of these features are possessed by a device which is compact in form and which may be easily operated by the slightest pressure on the trigger member.

What is claimed is:—

1. An artificial bait of the character described comprising a frame having opposed openings, a holding member disposed within the frame, one end of said holding member being bifurcated, hooks pivoted to the central portion of the bifurcation and projectable or retractible through the frame, a rod connected to one end of the holding member and slidable through the frame for retracting the hooks, a lip carried by one end portion of the holding member, a trigger spring secured to the frame and having a lip adapted to be engaged by the lip of the holding member, and a trigger member pivoted adjacent the holding member and adapted to release the trigger spring.

2. An artificial bait of the character described comprising a frame, plates carried by the side portions of said frame, a holding member disposed within the frame, one end of said holding member being bifurcated, a rod pivoted in the bifurcation and extending through the frame, a spring surrounding said rod, said spring being connected to the frame and holding member, hook members pivoted in the bifurcation and extending in opposite directions through the frame, a lip carried by the end portion of the holding member remote from the bifurcation, a trigger spring secured to one end portion of the frame, said spring having a lip adapted to engage the lip of the holding member, the plates of said body member cooperating with each other to provide a compartment for the reception of a trigger member, said trigger member being pivoted between the plates and having an arm arranged to engage one end of the trigger spring.

3. An artificial bait comprising a body, a longitudinally extending rod disposed within the body, blade-like hooks pivoted to the rod and normally disposed within the body but projectable therefrom, resilient means surrounding the rod engaging at one end with a wall of the body and at the other end with the rod and urging the rod in a direction to entirely retract the hooks, the rear end of the rod being provided with a tooth, a spring mounted within the rear end of the body and having a tooth adapted to engage the first named tooth to hold the rod retracted, and a trigger forming part of one wall of the body pivoted at its forward end thereto and at its rear end operatively engaging said latch whereby when said trigger is forced inward by a fish taking the bait the resilient latch is released from the rod to permit the projection of the rod and the projection of the blade-like hooks, said resilient latch urging the pivoted member outward to a normal position.

In testimony whereof I hereunto affix my signature.

CARL W. BORG.